(12) United States Patent
Kirsch (10) Patent No.: US 10,122,945 B2
(45) Date of Patent: Nov. 6, 2018

(54) IMAGE SENSOR WITH FLEXIBLE INTERCONNECT CAPABILITIES

(71) Applicant: SEMICONDUCTOR COMPONENTS INDUSTRIES, LLC, Phoenix, AZ (US)

(72) Inventor: Graham Kirsch, Bramley (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 25 days.

(21) Appl. No.: 15/464,068

(22) Filed: Mar. 20, 2017

(65) Prior Publication Data

US 2017/0195587 A1 Jul. 6, 2017

Related U.S. Application Data

(62) Division of application No. 14/633,261, filed on Feb. 27, 2015, now Pat. No. 9,641,776, which is a division
(Continued)

(51) Int. Cl.
*H04N 5/341* (2011.01)
*H04N 5/345* (2011.01)
(Continued)

(52) U.S. Cl.
CPC ............. *H04N 5/345* (2013.01); *H04N 5/341* (2013.01); *H04N 5/3454* (2013.01);
(Continued)

(58) Field of Classification Search
CPC ......... H01L 27/14645; H01L 27/14647; H01L 27/14652; H01L 27/14667;
(Continued)

(56) References Cited

U.S. PATENT DOCUMENTS 6,016,211 A 1/2000 Szymanski et al.
6,307,588 B1 10/2001 Olson et al.
(Continued)

FOREIGN PATENT DOCUMENTS

EP 2234387 9/2010
JP 11-150255 6/1999
(Continued)

*Primary Examiner* — Chia Wei A Chen
(74) *Attorney, Agent, or Firm* — Treyz Law Group, P.C.; Joseph F. Guihan (57) ABSTRACT

Electronic devices may include image sensors having configurable image sensor pixel interconnections. Image sensors may include image sensor pixels coupled to analog circuitry via configurable interconnect circuitry. The analog circuitry may include many analog circuit blocks. The analog circuit blocks may control and read out signals from associated image sensor pixels. The configurable interconnect circuitry may be controlled to reroute the connections between the analog circuit blocks and specific groups of image sensor pixels. Digital circuitry may be coupled to the analog circuitry via configurable interconnect circuitry. The digital circuitry may include digital circuit blocks. There may be significantly more image pixels controlled by a small number of analog circuit blocks, which are in turn controlled by a smaller number of digital circuit blocks. The image sensor pixel array, the configurable interconnect circuitry, the analog circuitry, and the digital circuitry may be vertically stacked.

18 Claims, 9 Drawing Sheets

Related U.S. Application Data of application No. 13/591,642, filed on Aug. 22, 2012, now Pat. No. 9,013,615.

(60) Provisional application No. 61/537,537, filed on Sep. 21, 2011.

(51) Int. Cl.

| | | |
|---|---|---|
| *H04N 5/372* | (2011.01) | |
| *H04N 5/376* | (2011.01) | |
| *H04N 5/378* | (2011.01) | |
| *H04N 5/3745* | (2011.01) | |

(52) U.S. Cl.
CPC .............. *H04N 5/372* (2013.01); *H04N 5/376* (2013.01); *H04N 5/378* (2013.01); *H04N 5/3765* (2013.01); *H04N 5/37455* (2013.01)

(58) Field of Classification Search
CPC .............. H01L 27/14868; H04N 5/372; H04N 5/37213; H04N 5/376; H04N 5/3765; H04N 5/378
See application file for complete search history.

(56) References Cited

U.S. PATENT DOCUMENTS

| | | | |
|---|---|---|---|
| 6,839,452 B1 | 1/2005 | Yang et al. | |
| 6,885,402 B1 | 4/2005 | Misawa | |
| 7,106,374 B1 | 9/2006 | Bandera et al. | |
| 7,153,720 B2 | 12/2006 | Augusto | |
| 7,200,293 B2 | 4/2007 | Iwasaki | |
| 7,394,148 B2 | 7/2008 | Kamezos | |
| 7,418,161 B2 | 8/2008 | Mouli | |
| 7,601,942 B2 | 10/2009 | Underwood et al. | |
| 7,906,363 B2 | 3/2011 | Koyanagi | |
| 8,421,025 B2 | 4/2013 | Gros D'Aillon et al. | |
| 8,426,897 B2 | 4/2013 | Aurola | |
| 8,427,200 B2 | 4/2013 | Or-Bach | |
| 8,440,542 B2 | 5/2013 | Sekar et al. | |
| 8,492,886 B2 | 7/2013 | Or-Bach et al. | |
| 8,541,819 B1 | 9/2013 | Or-Bach et al. | |
| 8,623,638 B2 | 1/2014 | Solomon | |
| 8,642,416 B2 | 2/2014 | Or-Bach et al. | |
| 8,754,533 B2 | 6/2014 | Or-Bach et al. | |
| 8,947,564 B2* | 2/2015 | Hirota .................... H04N 9/045 348/279 | |
| 2002/0149693 A1 | 10/2002 | Tantalo et al. | |
| 2004/0041932 A1 | 3/2004 | Chao et al. | |
| 2004/0060032 A1 | 3/2004 | McCubbrey | |
| 2004/0263875 A1* | 12/2004 | Okamoto .................. B41J 3/54 358/1.8 | |
| 2005/0068434 A1 | 3/2005 | Hatano et al. | |
| 2005/0281524 A1 | 12/2005 | Mouli | |
| 2006/0097963 A1 | 5/2006 | Yamamoto et al. | |
| 2006/0139469 A1* | 6/2006 | Yokota .................. H04N 3/1562 348/272 | |
| 2006/0206850 A1 | 9/2006 | McCubbrey | |
| 2006/0249765 A1 | 11/2006 | Hsieh | |
| 2007/0152345 A1 | 7/2007 | Wu et al. | |
| 2007/0170478 A1 | 7/2007 | Araki | |
| 2007/0222021 A1 | 9/2007 | Yao | |
| 2007/0278488 A1 | 12/2007 | Hirabayashi et al. | |
| 2008/0083939 A1 | 4/2008 | Guidash | |
| 2009/0109312 A1* | 4/2009 | Noda .................. H04N 5/23248 348/304 | |
| 2009/0200589 A1 | 8/2009 | Qian et al. | |
| 2010/0019130 A1 | 1/2010 | Lee | |
| 2010/0020880 A1* | 1/2010 | Susnow ........... H03K 19/17732 375/240.16 | |
| 2010/0157072 A1 | 6/2010 | Luo et al. | |
| 2010/0171196 A1 | 7/2010 | Steadman et al. | |
| 2010/0276572 A1 | 11/2010 | Iwabuchi et al. | |
| 2011/0037883 A1 | 2/2011 | Lee et al. | |
| 2011/0134303 A1 | 6/2011 | Jung et al. | |
| 2011/0207328 A1 | 8/2011 | Speakman | |
| 2012/0038802 A1* | 2/2012 | Arii ....................... H04N 5/3456 348/281 | |
| 2012/0147209 A1* | 6/2012 | Hiraoka .............. H04N 5/37455 348/222.1 | |
| 2012/0193682 A1* | 8/2012 | Hacker .................. H01L 23/525 257/209 | |
| 2012/0196409 A1 | 8/2012 | Or-Bach | |
| 2012/0211347 A1 | 8/2012 | Solhusvik et al. | |
| 2012/0218426 A1* | 8/2012 | Kaizu ................ H04N 5/35554 348/208.4 | |
| 2012/0273908 A1 | 11/2012 | Kinsman et al. | |
| 2013/0027578 A1* | 1/2013 | Matsuo ................. H04N 5/3658 348/222.1 | |
| 2013/0335602 A1* | 12/2013 | Lee ........................ H04N 5/367 348/247 | |
| 2015/0296113 A1* | 10/2015 | Kobayashi ............. H04N 5/145 348/230.1 |
| 2017/0214929 A1* | 7/2017 | Susnow ................ H04N 19/433 | |
| 2017/0244913 A1* | 8/2017 | Kobayashi ............. H04N 5/351 | |

FOREIGN PATENT DOCUMENTS

| | | |
|---|---|---|
| JP | 2000032344 | 1/2000 |
| JP | 2001174565 | 6/2001 |
| JP | 2002044527 | 2/2002 |
| JP | 2002301057 | 10/2002 |
| JP | 2008118434 | 5/2008 |
| JP | 2010183250 | 8/2010 |
| JP | 2010530633 | 9/2010 |
| JP | 2011023917 | 2/2011 |
| JP | 2011071958 | 4/2011 |
| JP | 2011078049 | 4/2011 |
| JP | 2001189891 | 7/2011 |
| WO | 2006129762 | 7/2006 |
| WO | 2010073520 | 7/2010 |
| WO | 2011097687 | 8/2011 |

\* cited by examiner

|  | 500 | 502 | 504 |  | 506 | 508 |  |
|---|---|---|---|---|---|---|---|
| f1_sel | 5 | 4 | 3 | 2 | 1 | 1 | ~1 |
| f0_sel | 4 | 3 | 2 | 1 | 0 | ~0 | ~0 |
| PIXEL NO. | CONNECTED TO ANALOG CIRCUITRY BLOCK NUMBER: (122 - ...) | | | | | | |
| 0 | 0 | 0 | 0 | 0 | 0 | 1 | 3 |
| 1 | 0 | 0 | 0 | 0 | 1 | 0 | 2 |
| 2 | 0 | 0 | 0 | 1 | 2 | 3 | 1 |
| 3 | 0 | 0 | 0 | 1 | 3 | 2 | 0 |
| 4 | 0 | 0 | 1 | 2 | 0 | 1 | 3 |
| 5 | 0 | 0 | 1 | 2 | 1 | 0 | 2 |
| 6 | 0 | 0 | 1 | 3 | 2 | 3 | 1 |
| 7 | 0 | 0 | 1 | 3 | 3 | 2 | 0 |
| 8 | 0 | 1 | 2 | 0 | 0 | 1 | 3 |
| 9 | 0 | 1 | 2 | 0 | 1 | 0 | 2 |
| 10 | 0 | 1 | 2 | 1 | 2 | 3 | 1 |
| 11 | 0 | 1 | 2 | 1 | 3 | 2 | 0 |
| 12 | 0 | 1 | 3 | 2 | 0 | 1 | 3 |
| 13 | 0 | 1 | 3 | 2 | 1 | 0 | 2 |
| 14 | 0 | 1 | 3 | 3 | 2 | 3 | 1 |
| 15 | 0 | 1 | 3 | 3 | 3 | 2 | 0 |

IMAGE SENSOR WITH FLEXIBLE INTERCONNECT CAPABILITIES

This application is a division of patent application Ser. No. 14/633,261, filed Feb. 27, 2015, which is a division of patent application Ser. No. 13/591,642, filed Aug. 22, 2012, which claims the benefit of provisional patent application No. 61/537,537, filed Sep. 21, 2011, which are hereby incorporated by reference herein in their entireties. This application claims the benefit of and claims priority to patent application Ser. No. 14/633,261, filed Feb. 27, 2015, patent application Ser. No. 13/591,642, filed Aug. 22, 2012, now U.S. Pat. No. 9,013,615, and provisional patent application No. 61/537,537, filed Sep. 21, 2011.

BACKGROUND

This invention relates generally to imaging devices, and more particularly, to imaging devices with configurable interconnect fabric.

Modern electronic devices such as cellular telephones, cameras, and computers often use digital image sensors to capture images. In a typical arrangement, an electronic device with an image sensor is provided with an array of image sensor pixels (sometimes referred to as image pixels) that are arranged in pixel rows and columns. Row control circuitry is coupled to each pixel row to provide row control signals to the image pixels such as reset and transfer control signals. Column circuitry is typically coupled to each column for reading out image signals from the image pixels.

Conventional image sensors typically feature row circuitry that implements raster scan techniques to sequentially read out the image signals from an image pixel array. When performing a raster scan, column circuitry processes the read out image signals on a row-by-row basis for the entire image pixel array. Accessing image pixels on a row-by-row basis using the row and column circuitry requires scanning the entire image pixel array before adjustments are made to individual image pixel signals. Processing image data in this way greatly limits the performance of the image sensor.

It would therefore be desirable to be able to provide imaging devices with more flexible pixel access capabilities.

SUMMARY

Various embodiments have been described illustrating an image sensor with configurable image sensor pixel interconnections. An image sensor may include an image sensor array formed from rows and columns of image sensor pixels. Analog control circuitry may control and read out the image sensor pixels in the image sensor pixel array. The analog control circuitry may be vertically stacked with respect to the image sensor pixel array. Configurable interconnect circuitry may be interposed between the analog control circuitry and the image sensor pixel array. The analog control circuitry may include a number of analog circuit blocks that are arranged into analog circuit block groups. The configurable interconnect circuitry may include configurable paths that couple each image sensor pixel in the image sensor pixel array to at least one analog circuit block in a corresponding analog circuit block group. The configurable interconnect circuitry may be controlled to reroute the connections between the image sensor pixels and the particular analog circuit blocks in each analog circuit block group.

In one suitable arrangement, the analog circuit blocks may be coupled to a group of image sensor pixels arranged in the image sensor array via the configurable interconnect circuitry. The group of image sensor pixels may be formed from a portion of the image sensor array. Addressing circuitry may supply control signals to the configurable interconnect circuitry to selectively route an analog circuit block to a corresponding image sensor pixel by rerouting the configurable paths in the first configurable interconnect fabric. Signals to and from a portion of the image sensor pixels in the image sensor pixel group may be routed to a first analog circuit block in the analog circuit block group and signals to and from a different portion of the image sensor pixels in the image sensor pixel group may be routed to a second analog circuitry block in the analog circuit block group. The configurable interconnect fabric may include a configurable interconnect circuit corresponding to each image pixel in the image pixel group.

Each image pixel in the image pixel group may be accessed simultaneously by the analog circuitry block group via the corresponding configurable interconnect circuits. Each group of image sensor pixels that is accessed may be formed, for example, from image pixels arranged in at least two adjacent rows, at least two adjacent columns, at least two non-adjacent rows, or at least two non-adjacent columns in the image sensor array. The image sensor array may include a first group of image sensor pixels and a second group of image sensor pixels. The image sensor pixels in the first group may be simultaneously accessed during a first time period and the image sensor pixels in the second group be simultaneously accessed during a second time period that is different than the first time period. A selected group of image sensor pixels in the image sensor array may be accessed simultaneously without accessing at least some image sensor pixels in the at least two rows that are part of another group of image sensor pixels that is different than the selected group.

The image sensor may be placed in a first configuration in which the configurable interconnect circuitry routes first control signals from a first analog control circuit block to a first image sensor pixel in the image sensor array and the configurable interconnect circuitry routes the first control signals to a second image sensor pixel in the image sensor array. When the image sensor is placed in the first configuration, the configurable interconnect circuitry may, for example, route the first control signals to the first image sensor pixel without routing the second control signals to the first image sensor pixel. When the image sensor is placed in the first configuration, the configurable interconnect circuitry may also route pixel output signals generated from the first image sensor pixel to the first analog circuit block.

The image sensor may also be placed in a second configuration in which the configurable interconnect circuitry routes second control signals from a second analog control circuit block to the first image sensor pixel and the configurable interconnect circuitry routes pixel output signals generated from the first image sensor pixel to the second control circuit.

A configurable interconnect circuit may include a pixel control signal routing multiplexer which serves to route control signals from the analog circuit blocks in the analog circuit block group to the corresponding image pixel. The configurable interconnect circuit may also include a pixel output signal routing multiplexer which serves to route pixel output signals from the corresponding image pixel to the analog circuit block group.

The configurable interconnect circuit may also include multiplexers hardwired with the address of the corresponding pixel to its data inputs and logic XOR gates that are coupled to the multiplexers. The addressing circuitry may provide selector and inversion control signals to the multiplexers and XOR gates to control the pixel output signal routing multiplexer and the pixel control signal routing multiplexer. The addressing circuitry may control the routing of pixel output signals and pixel control signals by adjusting control signals provided to the multiplexers and XOR gates.

As an example, four analog control blocks may be coupled to 64 image pixels in an image pixel group via configurable paths. Two multiplexers with six data inputs and two XOR gates may be provided with control signals for routing each of the 64 image pixels to one of the four analog circuit blocks.

As another example, four analog control blocks may be coupled to 16 image pixels in an image pixel group via configurable paths. Two multiplexers with four data inputs and two XOR gates may be provided with control signals for routing each of the 16 image pixels to one of the four analog circuit blocks.

Image sensor digital processing and control circuitry may control the image sensor pixels in the image sensor pixel array and receive image signals from the analog control circuitry. The image sensor digital processing and control circuitry may be vertically stacked with respect to the analog control circuitry. A second configurable interconnect circuitry may be interposed between the analog control circuitry and the digital circuitry. The digital circuitry may include a number of digital circuit blocks that are arranged into digital circuit block groups. The second configurable interconnect fabric may include many configurable paths that couple each analog circuit block in the analog circuit block group to at least one digital circuit block in a corresponding digital circuit block group. The digital circuitry may be coupled to processing circuitry via memory circuit blocks.

The digital processing and control circuitry, analog control circuitry, first configurable interconnect circuitry, and second configurable interconnect circuitry may be formed on shared or separate integrated circuits. The integrated circuits may be vertically stacked. There may be a large number of image sensor pixels in the image sensor pixel array coupled to a small number of analog circuit blocks in the analog control circuitry which are coupled to an even smaller number of digital circuit blocks in the digital control circuitry. The wiring complexity of and the number of interconnections at the pixel level may be substantially greater than the number of interconnections at the digital block level.

The image sensor with configurable pixel interconnections may be implemented in a system that also includes a central processing unit, memory, input-output circuitry, and an imaging device that further includes a pixel array, a lens for focusing light onto the pixel array, and a data converting circuit.

DETAILED DESCRIPTION

Electronic devices such as digital cameras, computers, cellular telephones, and other electronic devices include image sensors that gather incoming light to capture an image. The image sensors may include large arrays of image sensor pixels (sometimes referred to as image pixels). The image pixels may include photosensitive elements such as photodiodes that convert the incoming light into charge. Image sensors may have any number of image pixels (e.g., hundreds or thousands or more). A typical image sensor may, for example, have hundreds or millions of image pixels (e.g., megapixels). Image sensors may include control circuitry, such as circuitry for operating the image pixels, and readout circuitry for reading out image signals corresponding to the electric charge collected using the photosensitive elements.

Figure 1:
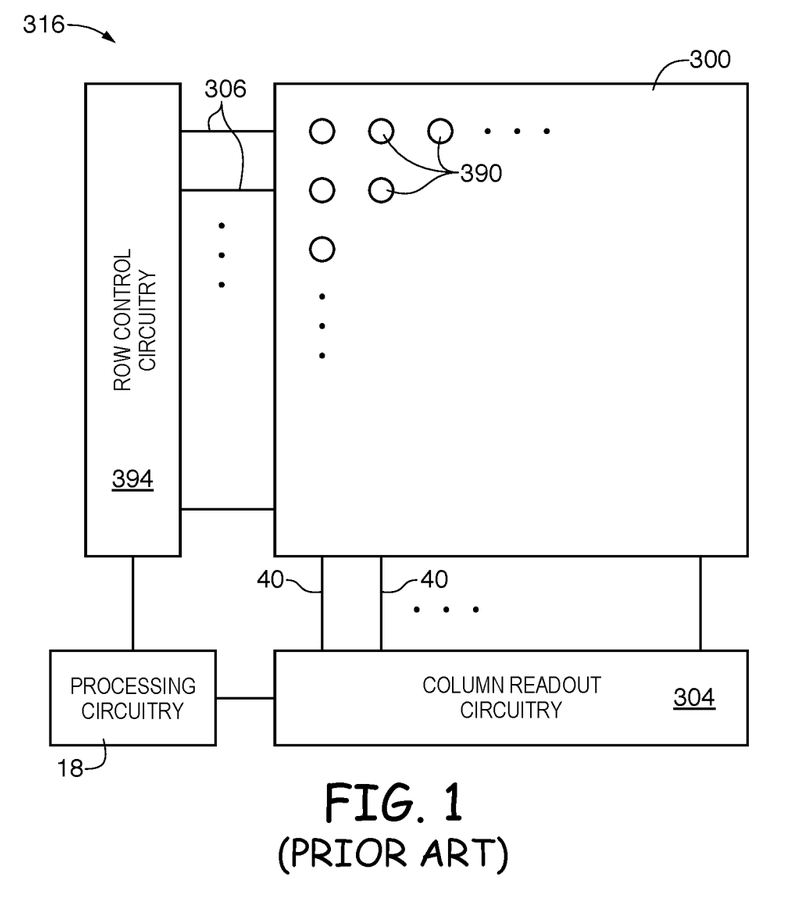
FIG. 1 is a diagram of a conventional image sensor with image sensor pixels that are connected to row and column lines.

FIG. 1 is a diagram of conventional image sensor circuitry for image pixel control and readout. Image sensor 316 includes image sensor pixel array 300 containing image sensor pixels 390 arranged in rows and columns. Processing circuitry 18 is coupled to row control circuitry 394 and column readout circuitry 304. Row control circuitry 394 receives row addresses from processing circuitry 18 and supplies corresponding row control signals to image pixels 390 via control paths 306. Image pixels 390 in each column of image pixel array 300 are connected to a corresponding column line 40. During image pixel readout operations, a pixel row in image pixel array 300 is selected by row control circuitry 394 and image data associated with image pixels 390 in that pixel row is read out via column lines 40.

Image sensor 316 typically performs raster scans to control and read out image pixels 390. During a raster scan, row control circuitry 394 selects one row of image pixels 390 for readout. Row control circuitry 394 then selects the next row of image pixels 390 in image pixel array 300 for readout. The different rows in array 300 are sequentially accessed until the entire image pixel array 300 has been read out. Each pixel 390 arranged along the same row is connected to a common row control line 306, whereas each pixel 390 arranged along the same column is connected to a common column line 40. Connected using this arrangement, the flexibility with which image pixels 390 can be read out is limited. Implementing a raster scan requires reading out the entire image pixel array before gain adjustments can be made to image signals from any individual pixel. It may therefore be desirable to be able to access desired subsets of image pixels via configurable interconnections.

Figure 2:
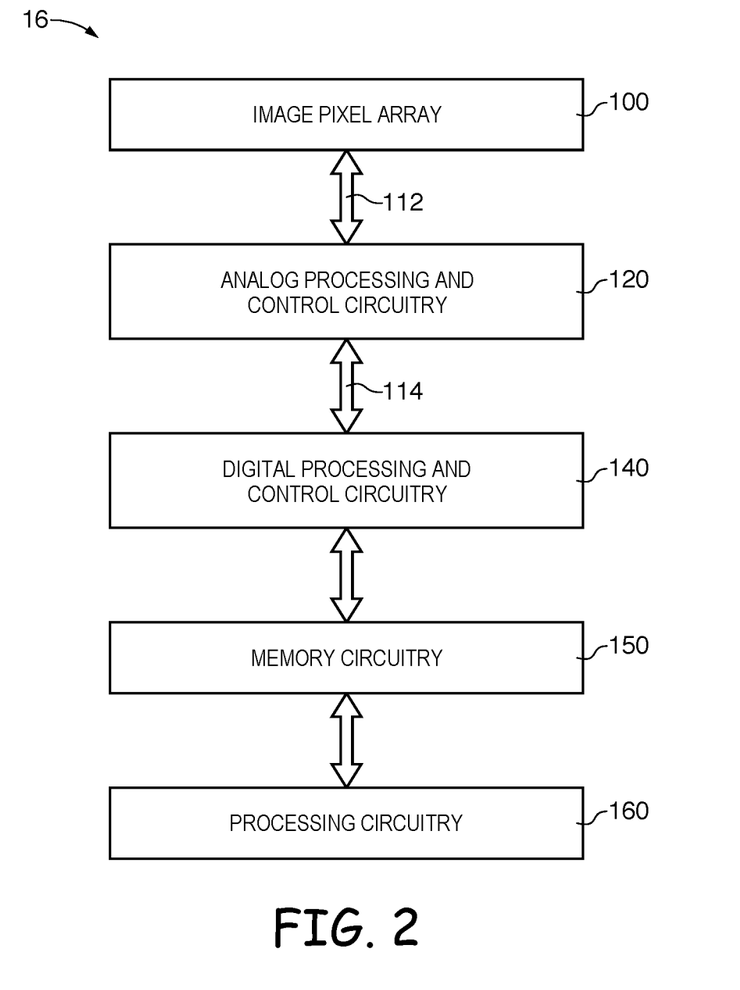
FIG. 2 is a diagram of an illustrative image sensor with circuitry for processing image data in a hierarchical fashion in accordance with an embodiment of the present invention.

FIG. 2 is a block diagram of an illustrative image sensor having circuitry that allows for control and readout of an image pixel array via configurable interconnections in accordance with an embodiment of the present invention. Image sensor 16 may include image pixel array 100 coupled to analog processing and control circuitry 120 via configurable paths 112. Analog processing and control circuitry 120 may send control signals to image pixel array 100 and may receive image signals from image pixel array 100 via respective paths 112. Depending on the current configuration of paths 112, each image sensor pixel in array 100 may be coupled to a selected analog block in circuitry 120.

Analog processing and control circuitry 120 may be coupled to digital processing and control circuitry 140 via configurable paths 114. Analog processing and control circuitry 120 may process image signals (e.g., perform analog-to-digital conversion) before conveying the image signals to digital processing and control circuitry 140. Digital processing and control circuitry 140 may send control signals to analog processing and control circuitry 120 as well as to image pixel array 100.

Circuitry 140 may be coupled to memory circuitry 150. Digital processing and control circuitry 140 may further process image signals that are received from analog processing and control circuitry 120 before forwarding the image signals to memory circuitry 150.

Memory circuitry 150 may be coupled to processing circuitry 160. Memory circuitry 150 may temporarily store image signals that are received from digital processing and control circuitry 140 before sending the image signals to processing circuitry 160. Processing circuitry 160 may further process the image signals that are received from memory circuitry 150.

Figure 3:
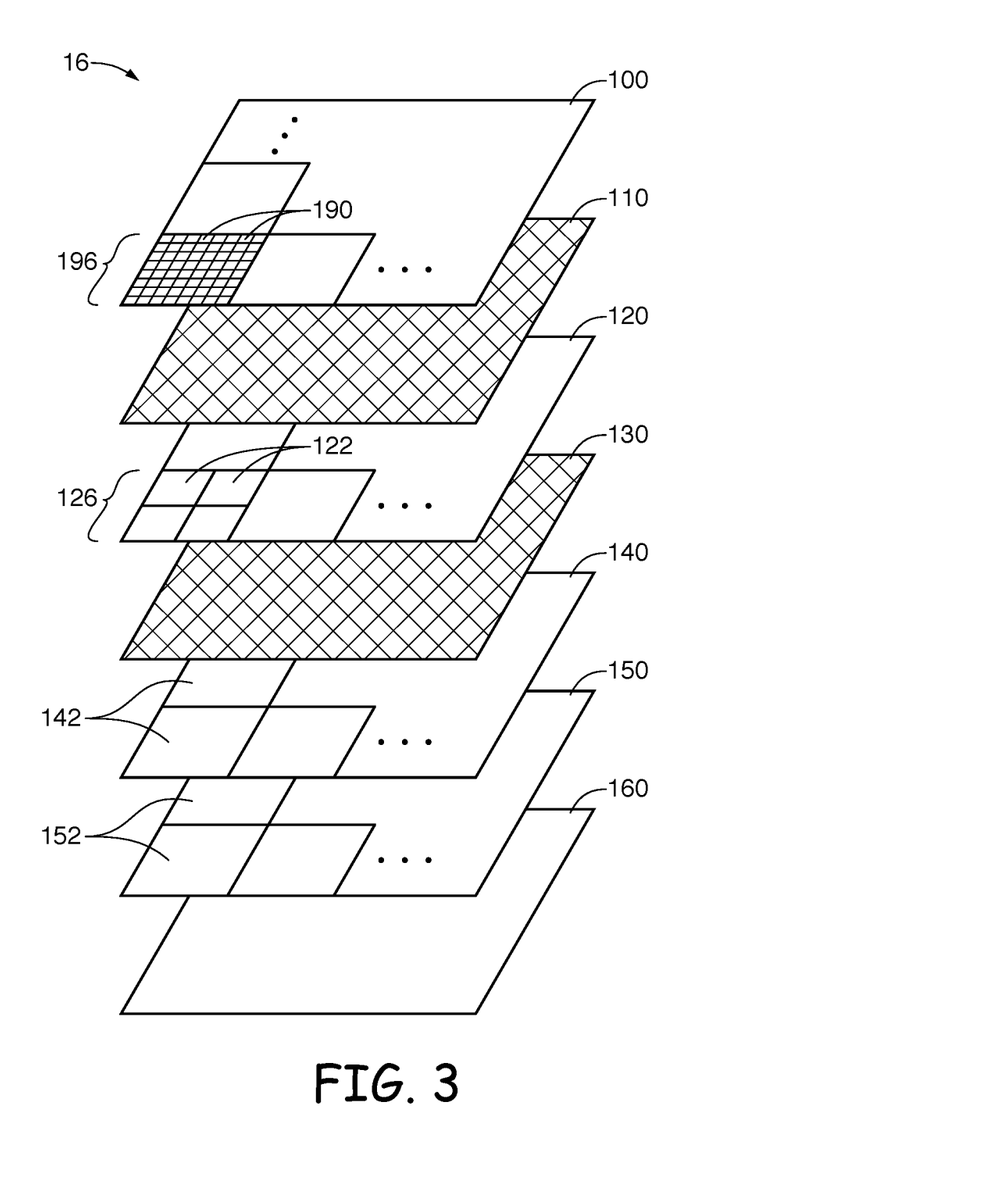
FIG. 3 is a diagram of an illustrative image sensor having multiple layers of circuitry coupled to one another via configurable interconnect fabric in accordance with an embodiment of the present invention.

The circuitry of FIG. 2 may be arranged in a stacked layer configuration as shown in FIG. 3 in accordance with an embodiment of the present invention. Image sensor 16 may include image pixel array 100 coupled to analog processing and control circuitry 120 via first configurable interconnect fabric 110 that is interposed between image pixel array 100 and analog processing and control circuitry 120. Analog processing and control circuitry 120 may be coupled to digital processing and control circuitry 140 via second configurable interconnect fabric 130 that is interposed between analog processing and control circuitry 120 and digital processing and control circuitry 140. Memory 150 may serve as a buffer between digital processing and control circuitry 140 and processing circuitry 160.

Image pixel array 100 may include hundreds or thousands of image pixels 190 arranged in rows and columns. Image pixels 190 may gather light to generate image signals. The image signals that are generated by image pixels 190 may be read out, stored in memory, or further processed. Analog processing and control circuitry 120 and digital processing and control circuitry 140 may supply control signals (e.g., pixel reset signals, charge transfer gate control signals, pixel select signals, etc.) to at least some of image pixels 190.

First interconnect fabric 110 may be formed as an integral part of image pixel array 100, as an integral part of analog processing and control circuitry 120, or separately in its own integrated circuit. For example, consider an example in which array 100 is formed on a first integrated circuit and circuitry 120 is formed on a second integrated circuit. In one suitable arrangement, fabric 110 may be formed on the first integrated circuit. In another suitable arrangement, fabric 110 may be formed on the second integrated circuit. In yet another suitable arrangement, fabric 110 may be formed on a third integrated circuit that is interposed between the first and second integrated circuits when all three devices are stacked together.

Analog processing and control circuitry 120 may include a number of analog circuit blocks 122 that are coupled to image pixels 190 via first interconnect fabric 110. Analog circuit blocks 122 may include control circuitry, data sampling circuitry (e.g., sample-and-hold circuits), readout circuitry, data conversion circuitry, or other circuitry for interfacing with pixel array 100 via first interconnect fabric 110. First interconnect fabric 110 may include configurable paths 112 (see FIG. 2) that couple image pixels 190 to analog circuit blocks 122. Paths 112 may be configured to change the electrical connections between analog circuit blocks 122 and image pixels 190.

For example, paths 112 may be placed in a first configuration to couple a first analog circuit block 122 to a first subset of image pixels 190 in image pixel array 100 or may be placed in a second configuration to couple the first analog circuit block 122 to a second subset of image pixels 190 in image pixel array 100. Paths 112 may be supplied with control signals for placing paths 112 in the desired configuration.

Image sensor array 100 may be divided into respective groups of image pixels, where each group of image pixels may be referred to as an image pixel group 196. In an example, image pixel group 196 may be formed from image pixels 190 arranged along at least two adjacent rows and at least two adjacent columns in image sensor array 100. In another example, image pixel group 196 may be formed from image pixels 190 arranged along non-adjacent rows and non-adjacent columns in image sensor array 100. Similarly, circuitry 120 may contain multiple analog circuit blocks 122 that are divided into respective groups of analog circuit blocks, where each group of analog circuit blocks 122 may be referred to as an analog circuit block group 126. Each image pixel 190 may be coupled to at least one analog circuit block 122 in a corresponding group 126 via configurable paths 112 in first interconnect fabric 110. Paths 112 may be configured to selectively allow at least one analog circuit block 122 in analog circuit block group 126 to provide control signals to each image pixel 190 and to receive image signals from each image pixel in image pixel group 196.

In the example of FIG. 3, image pixel group 196 includes 64 image pixels 190 and analog circuit block group 126 includes four analog circuit blocks 122. A first configuration of paths 112 may allow a portion of image pixels 190 in image pixel group 196 to be coupled to each analog circuit block 122 in analog circuit block group 126 (e.g., a first portion of image pixels 190 in image pixel group 196 may be coupled to a first analog circuit block 122 in analog circuit block group 126, a second portion of image pixels 190 may be coupled to a second analog circuit block 122, etc). A second configuration of paths 112 may allow each group of image pixels 190 in image pixel group 196 to be coupled to a different one of each of the four analog circuit blocks 122 (e.g., the first group of image pixels 190 may be coupled to the second analog circuit block 122, the second group of image pixels 190 may be coupled to the first analog circuit block, etc). In this way, more than one image pixel 190 may be controlled and read out using each analog circuit block 122, and the connections between each analog circuit block 122 and image pixels 190 may rerouted as the configuration of paths 112 is changed.

Second interconnect fabric 130 may be formed as a part of analog processing and control circuitry 120, as a part of digital processing and control circuitry 140, or separately in its own integrated circuit. For example, consider an example in which circuitry 120 is formed on integrated circuit X and circuitry 140 is formed on integrated circuit Y. In one suitable arrangement, fabric 130 may be formed on integrated circuit X. In another suitable arrangement, fabric 130 may be formed on integrated circuit Y. In yet another suitable arrangement, fabric 130 may be formed on a separate integrated circuit Z that is interposed between integrated circuits X and Y when all three devices are stacked together.

Digital processing and control circuitry 140 may include digital circuit blocks 142 that are coupled to analog circuit blocks 122 via configurable paths 114 in second interconnect fabric 130 (see FIG. 2). Paths 114 may serve as configurable interconnection paths between analog circuit blocks 122 and digital circuit-blocks 142. Digital circuit blocks 142 may include control circuitry, readout circuitry, conversion circuitry, or other circuitry related to the control of image pixels 190 and the processing of image signals from image pixels 190.

Digital circuit blocks 142 may be coupled to a number of analog circuit blocks 122. In the example of FIG. 3, four analog circuit blocks 122 in analog circuit block group 126 may be coupled to one digital circuit block 142 via corresponding paths 114. Coupled in this way, multiple analog circuit blocks 122 may be controlled and read out using only one digital circuit block 122.

The wiring complexity of device 16 may drastically decrease when progressing from layer 100 to layer 160 (e.g., the number of interconnections at the pixel level may be substantially greater than the number of interconnections at the digital block level). For example, a small number of digital circuit blocks 142 may be coupled to a large number of analog circuit blocks 122. The large number of analog circuit blocks 122 may also be coupled to an even larger number of image pixels 190. This type of interconnect arrangement allows for a small number of digital and analog control and processing circuit blocks to directly control a large number of image pixels 190. The connections between analog processing and control circuitry 120 and image pixels 190 can be adjusted by reconfiguring paths 112, and the connections between digital circuitry 140 and analog circuitry 120 can be adjusted by reconfiguring paths 114, allowing for a flexible image pixel control and readout process in image sensor 16.

Image sensor 16 of FIG. 3 is merely illustrative. If desired, image pixels 190 may be formed in any suitable arrangement in image pixel array 100. Image pixel group 196 may include any number of image pixels 190. Analog circuit block group 126 may include any number of analog circuit blocks 122. Any number of image pixels 190 may be coupled to any number of analog circuit blocks 122 via programmable interconnect fabric 110, whereas any number of analog circuit blocks 122 may be coupled to any number of digital circuit blocks 142 via programmable interconnect fabric 130.

Figure 4:
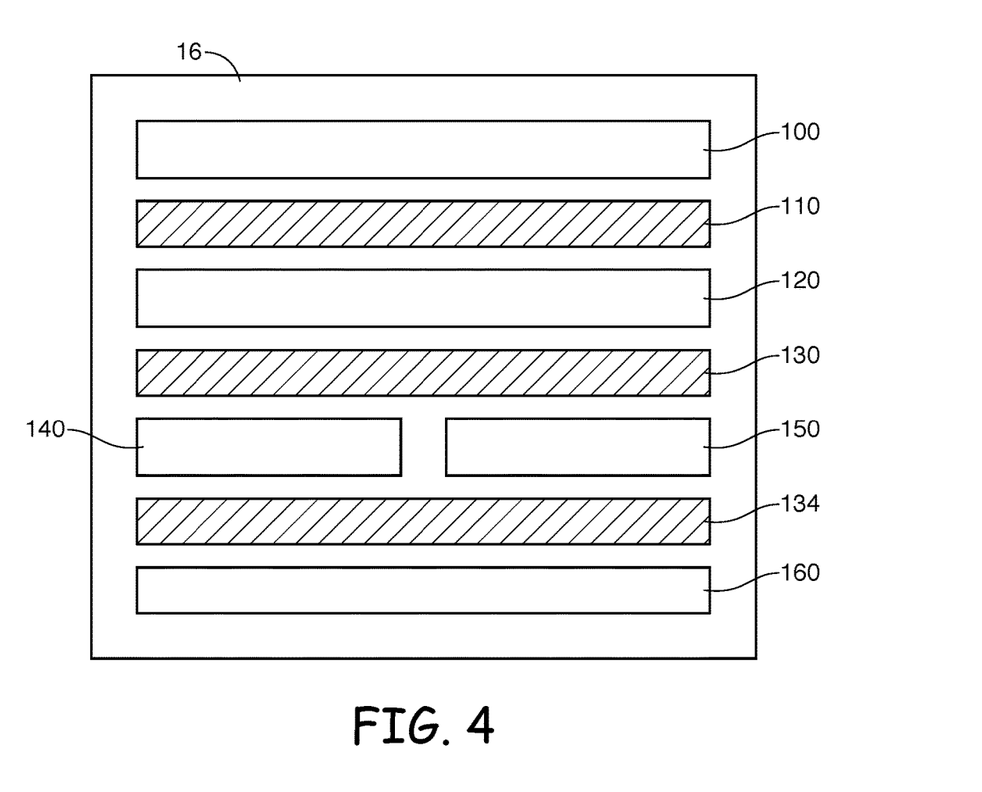
FIG. 4 is a diagram of an illustrative image sensor with vertically and horizontally stacked circuits in accordance with an embodiment of the present invention.

Image pixel array 100, interconnect fabrics 110 and 130, analog processing and control circuitry 120, digital processing and control circuitry 140, memory circuitry 150, and processing circuitry 160 may be formed using any suitable number of integrated circuits. For example, digital processing and control circuitry 140 may be formed on the same integrated circuit layer as memory circuitry 150, as shown in FIG. 4 in another embodiment of the invention. Additional layers of interconnect fabric may be used, such as a third interconnect fabric 134 interposed between the processing circuitry 160 and the integrated circuit layer that includes digital processing and control circuitry 140 and memory circuitry 150. Interconnect fabric 134 may be formed as a part of memory circuitry 150 and digital processing and control circuitry 140, or as a part of processing circuitry 160, or on its own separate integrated circuit.

Figure 5:
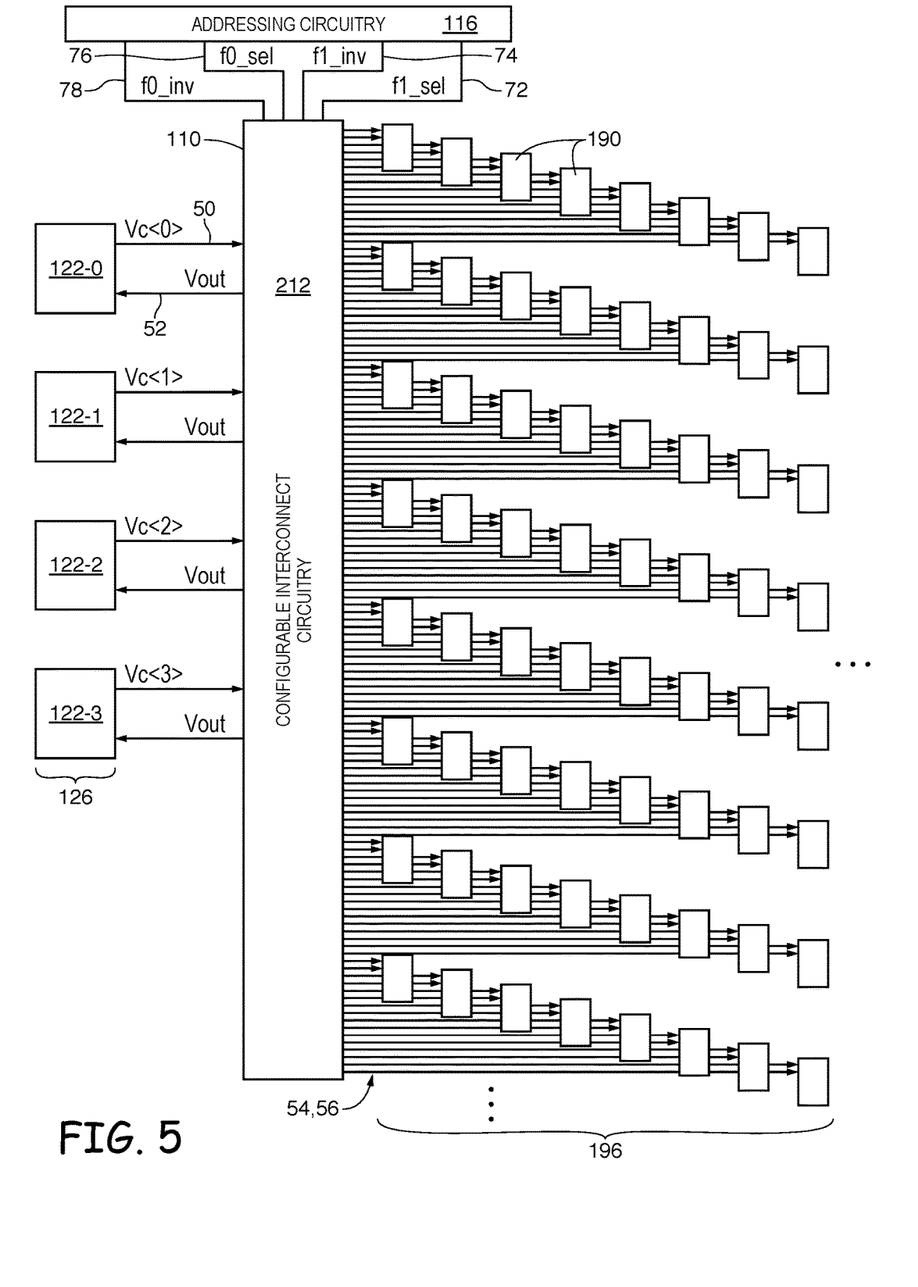
FIG. 5 is a diagram of an illustrative image sensor with configurable pixel interconnects in accordance with an embodiment of the present invention.

One suitable arrangement of the interconnect fabric coupling the analog processing and control circuitry 120 to image pixels 190 in image sensor 16 is shown in FIG. 5. Analog circuit blocks 122 may be coupled to first interconnect fabric 110 via interconnect input lines 50 and interconnect output lines 52. First interconnect fabric 110 may include configurable interconnect circuitry 212 that is coupled to interconnect input lines 50 and interconnect output lines 52. Pixels 190 may be selectively routed to one analog circuit block 122 in analog circuit block group 126 by rerouting paths 112 using configurable interconnect circuitry 212.

Analog circuit block group 126 may supply pixel control signals Vc to configurable routing circuitry 212 via interconnect input lines 50. For example, a first analog block 122-0 may supply a first pixel control signal Vc<0>; second analog block 122-1 may supply a second pixel control signal Vc<1>; third analog block 122-2 may supply a third pixel control signal Vc<2>; and a fourth analog block 122-3 may supply a fourth pixel control signal Vc<3> to interconnect circuitry 212. Pixel control signals Vc may include pixel reset signals, charge transfer gate control signals, and other suitable signals for controlling image pixels 190. Interconnect circuitry 212 may convey pixel output signals Vout to analog circuit blocks 122 via interconnect output paths 52. Pixel output signals Vout may include reset level or image level signals.

Device 16 may also include addressing circuitry 116 that is used to supply first selector bits f1_sel and first inversion bit f1_inv to configurable interconnect circuitry 212 via lines 72 and 74, respectively. In addition, addressing circuitry 116 may supply second selector bits f0_sel and second bit inversion signal f0_inv to configurable interconnect circuitry 212 via lines 76 and 78, respectively. Addressing circuitry 116 may be formed as a part of analog processing and control circuitry 120, digital processing and control circuitry 140, processing circuitry 160, or as its own independent integrated circuit. Interconnect circuitry 212 may route configurable paths 112 to a plurality of image pixels 190 via pixel control lines 54 and pixel output lines 56.

In the example of FIG. 5, analog circuit block group 126 may include four analog circuit blocks 122 (e.g., a first analog circuit block 122-0, a second analog circuit block 122-1, etc.) and a corresponding image pixel group 196 may include 64 image pixels 190 that are coupled to analog circuit block group 126 via routing paths 112. Analog circuit blocks 122 may send pixel control signals Vc to configurable interconnect circuitry 212 via interconnect input lines 50. Addressing circuitry 116 may provide first selector bits f1_sel, first inversion bit f1_inv, second selector bits f0_sel, and second inversion bit f0_inv to configurable interconnect circuitry 212 to selectively route pixel control signals Vc from interconnect input lines 50 to selected image pixels 190 via pixel control lines 54. First selector bits f1_sel, first inversion bit f1_inv, second selector bits f0_sel, and second inversion bit f0_inv may serve to program paths 112 so that each image pixel 190 receives control signal Vc from a selected one of blocks 122.

Configurable interconnect circuitry 212 may receive pixel output signals Vout from image pixels 190 via pixel output lines 56. Addressing circuitry 116 may provide first selector bits f1_sel, first inversion bit f1_inv, second selector bits f0_sel, and second inversion bit f0_inv to interconnect circuitry 212 to selectively route pixel output signals Vout from pixel output lines 56 to selected analog circuit blocks 122 via interconnect output lines 52 (e.g., programmable paths 112 may route pixel output signal Vout to analog circuit block 122-0, may route pixel output signal Vout to analog circuit block 122-1, etc.). Configurable interconnect circuitry 212 may program paths 112 to route pixel control signals Vc to a particular image pixel 190 and to route pixel output signals from the particular image pixel 190 to an associated analog circuit block 122. In this way, image sensor 16 may flexibly select which image pixels 190 in image pixel group 196 are controlled and read out by analog circuit blocks 122.

Figure 6:
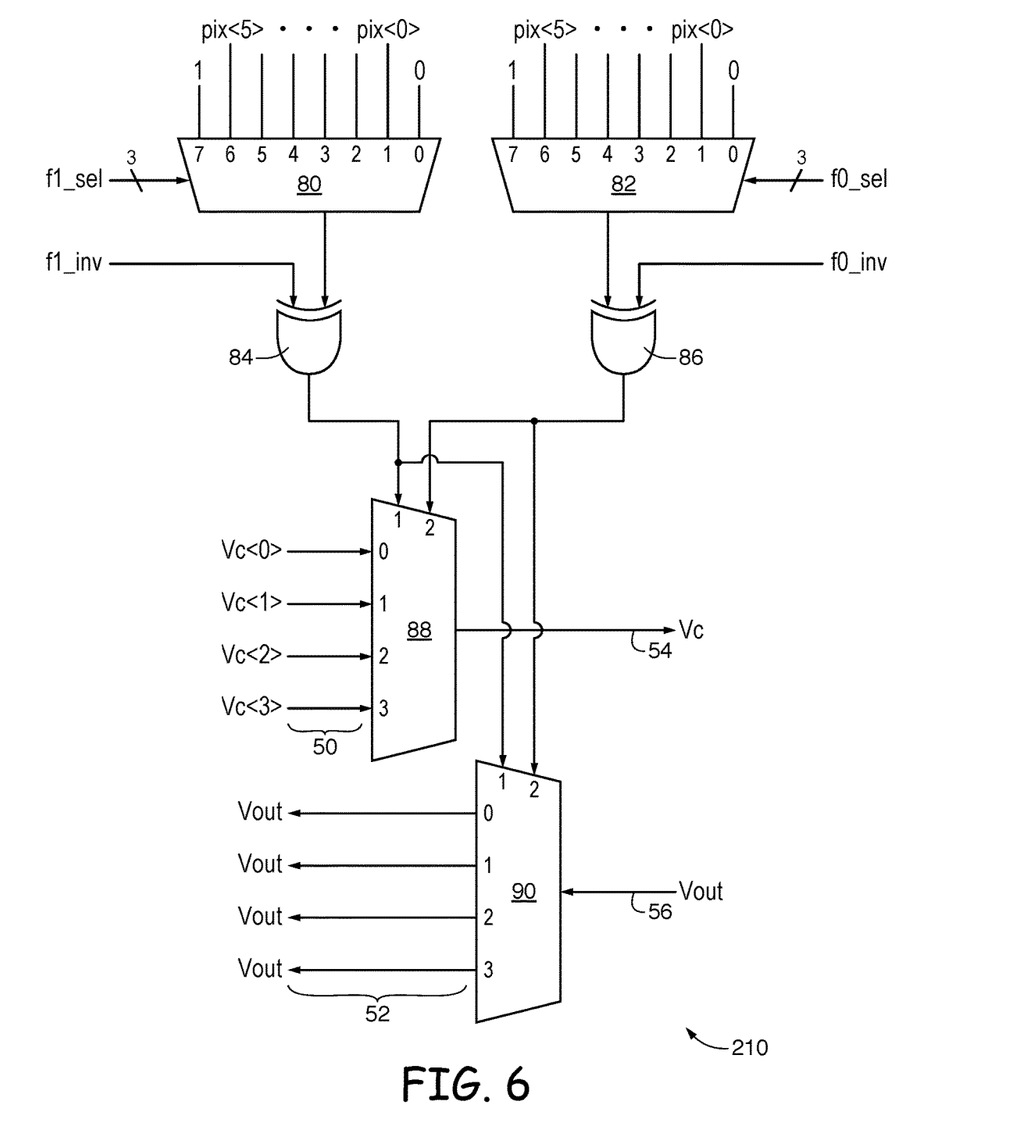
FIG. 6 is a circuit diagram of a configurable pixel access path in accordance with an embodiment of the present invention.

FIG. 6 shows a circuit diagram showing one possible implementation of a set of configurable routing circuits 210 interposed in path 112 in accordance with an embodiment of the invention. Each image pixel 190 may have its own associated set of configurable routing circuit 210 formed in configurable interconnect circuitry 212. Configurable interconnecting routing circuit 210 may include a first multiplexer 80, a second multiplexer 82, a first logic XOR gate 84, a second logic XOR gate 86, a pixel control signal routing multiplexer 88, and a pixel output signal routing multiplexer 90 (sometimes referred to as a demultiplexer). In the example of FIG. 6, first multiplexer 80 and second multiplexer 82 may have a data input terminal 0, a data input terminal 7, data inputs <6:1>, an output, and a control input that receives control signals to route one of the data inputs to the output. Pixel control signal routing multiplexer 88 may have data inputs <3:0>, an output, and first and second control inputs that receive control signals to route one of the data inputs to the output. Pixel output signal routing multiplexer 90 may have data outputs <3:0>, an input, and first and second control inputs that receive control signals to route one of the data outputs to the input.

The control inputs of first multiplexer 80 may be coupled to addressing circuitry 116 via paths 72, as shown in FIG. 5. The control inputs of first multiplexer 80 may receive first selector bits f1_sel from addressing circuitry 116. Data input terminal 0 of first multiplexer 80 may receive a constant ground signal. Data input terminal 7 of first multiplexer 80 may receive a constant high signal. The data inputs <6:1> of first multiplexer 80 may receive pixel address bits pix<5:0> (assuming each pixel group 196 includes 64 image pixels). Pixel address bits pix<5:0> may be hardwired in each interconnect circuit 210 to provide a specific address for each corresponding image pixel 190 in image pixel group 196. For example, a $0^{th}$ pixel in array 100 may be designated a predetermined pixel address of "000000." As another example, a $3^{rd}$ pixel in array 100 may be given a predetermined pixel address of "000011." As another example, a $34^{th}$ pixel in array 100 may be given a fixed pixel address of "100010." Based on first selector bits f1_sel, signals at a selected one of the inputs of first multiplexer 80 may be routed to the output of first multiplexer 80.

The output of first multiplexer 80 may be coupled to an input of first XOR gate 84. The input of first XOR gate 84 may also be coupled to addressing circuitry 116. The input of first XOR gate 84 may receive first inversion bit f1_inv from addressing circuitry 116. An output of first XOR gate 84 may be coupled to the first control inputs of pixel control signal routing multiplexer 88 and pixel output demultiplexer 90.

The control inputs of second multiplexer 82 may be coupled to addressing circuitry 116 via paths 72. The control inputs of second multiplexer 82 may receive second selector bits f0_sel from addressing circuitry 116. Data input terminal 0 of second multiplexer 82 may receive a constant ground signal. Data input terminal 7 of second multiplexer 82 may receive a constant high signal. The data inputs <6:1> of second multiplexer 82 may receive pixel address bits pix<5:0> (assuming each pixel group 196 includes 64 image pixels). Pixel address bits pix<5:0> may be hardwired in each interconnect circuit 210 to provide a specific address for each corresponding image pixel 190 in image pixel group 196. For example, a $0^{th}$ pixel in array 100 may be designated a predetermined pixel address of "000000." As another example, a $3^{rd}$ pixel in array 100 may be given a predetermined pixel address of "000011." As another example, a $34^{th}$ pixel in array 100 may be given a fixed pixel address of "100010." Based on second selector bits f0_sel, signals at a selected one of the inputs of second multiplexer 82 may be routed to the output of second multiplexer 82.

The output of second multiplexer 82 may be coupled to an input of second XOR gate 86. The input of second XOR gate 86 may also be coupled to addressing circuitry 116. The input of second XOR gate 86 may receive second inversion bit f0_inv from addressing circuitry 116. An output of second XOR gate 86 may be coupled to the second control inputs of pixel control signal routing multiplexer 88 and pixel output demultiplexer 90. Data inputs <3:0> of pixel control signal routing multiplexer 88 may be coupled to analog circuit block group 126 via interconnect input lines 50. The output of pixel control signal routing multiplexer 88 may be coupled to an image pixel 190 in image pixel group 196 via pixel control line 54. The data input of pixel output demultiplexer 90 may be coupled to an image pixel 190 via pixel output line 56. Outputs <3:0> of pixel output demultiplexer 90 may be coupled to analog circuit block group 126 via interconnect output lines 52.

Four analog circuit blocks 122 in analog circuit block group 126 may be coupled to data inputs <3:0> of pixel control signal routing multiplexer 88 and outputs <3:0> of pixel output demultiplexer 90, as shown in FIG. 5. The output of pixel control multiplexer 88 and the input of pixel output demultiplexer 90 may each be coupled to one of the 64 image pixels 190 in image pixel group 196. Pixel address bits pix<5:0> that are supplied to data inputs <6:0> of first multiplexer 80 and second multiplexer 82 may correspond to each image pixel 190 in image pixel group 196. First selector bits f1_sel may be supplied by addressing circuitry 116 to route the signal from one of data inputs <6:0> of first multiplexer 80 to the input of first XOR gate 84. Second selector bits f0_sel may be supplied by addressing circuitry 116 to route the signal from one of data inputs <6:0> of second multiplexer 82 to the input of second XOR gate 86. First inversion bit f1_inv may be used to selectively invert the bit supplied to first XOR gate 84 from first multiplexer 80. Second inversion bit f0_inv may be used to selectively invert the bit supplied to second XOR gate 86 from second multiplexer 82.

The output bits from first XOR gate 84 and second XOR gate 86 may form the control inputs for multiplexer 88. The output bits may control multiplexer 88 to route the control signal Vc that is supplied by a particular analog circuit block 122 to the associated image pixel 190. The output bits from first XOR gate 84 and second XOR gate 86 may also form the control inputs for pixel output demultiplexer 90. The output bits may control demultiplexer 90 to route the pixel output signal Vout from the associated image pixel 190 to a particular analog circuit block 122. In this way, first selector bits f1_sel, second selector bits f0_sel, first inversion bit f1_inv, and second inversion bit f0_inv, may be used to selectively route the image pixel associated with each configurable interconnect circuit 210 to the individual analog circuit blocks 122 in analog circuit block group 126 by rerouting paths 112. The routing of Vc and Vout between analog circuit blocks 122 and image pixels 190 may be controlled based on pixel address bits pix<5:0>, f1_sel, f0_sel, f1_inv, and f0_inv.

Programmable paths 112 of FIGS. 5 and 6 are merely illustrative. If desired, analog circuit block group 126 may include any number of analog circuit blocks 122, and image pixel group 196 may include any number of image pixels 190. First multiplexer 80 and second multiplexer 82 in configurable interconnect circuit 210 may include however many data inputs, pixel addressing bits pix, first selector bits f1_sel, and second selector bits f0_sel, as are needed to provide a unique address to each pixel in image pixel group 196. Pixel control signal routing multiplexer 88 may be formed with a data input corresponding to each analog circuit block 122 in analog circuit block group 126. Pixel output demultiplexer 90 may be formed with data outputs corresponding to each data input used in pixel control multiplexer 88. Additional multiplexers and XOR gates may be formed to ensure that a suitable number of control inputs are supplied to pixel control multiplexer 88 and pixel output demultiplexer 90. Each analog circuit block 122 that is coupled to interconnect circuit 210 may thereby be connected to the corresponding image pixel 190. Configurable paths 112 of the type shown in FIGS. 5 and 6 may also be formed on paths 114 of second interconnect fabric 130, as shown in FIG. 2, to provide similar interconnects between analog processing and control circuitry 120 and digital processing and control circuitry 140.

Figure 7:
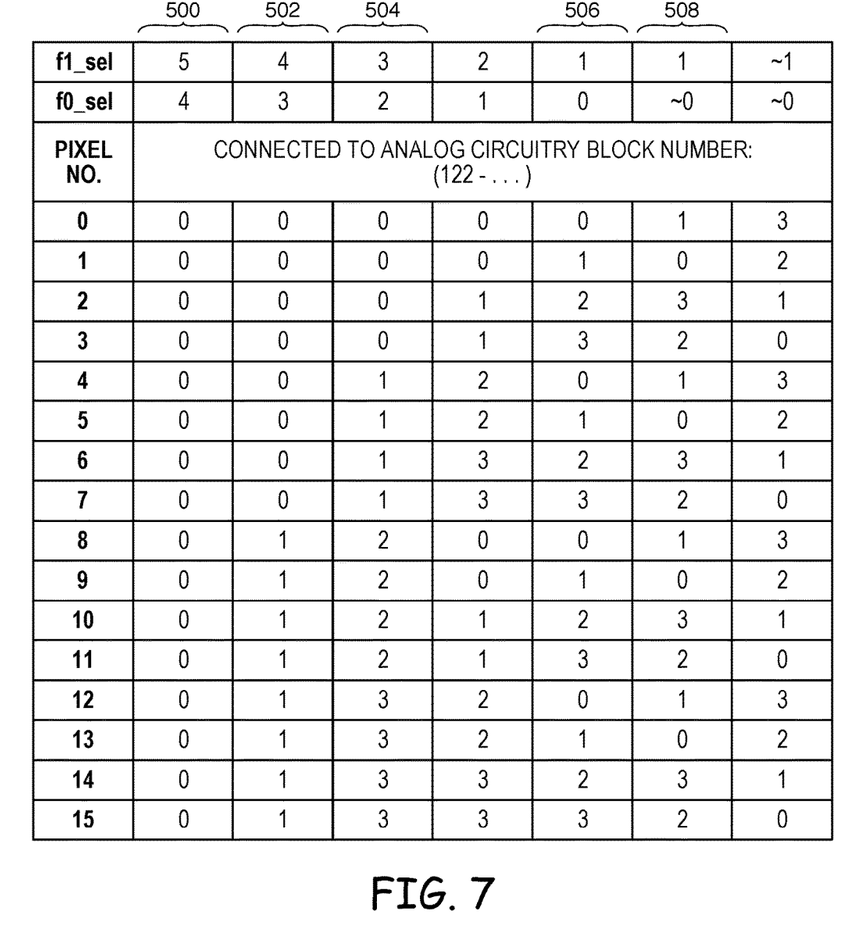
FIG. 7 is a table summarizing image pixel interconnections as a function of user-specified control signals in accordance with an embodiment of the present invention.

FIG. 7 shows a table that illustrates the interconnection between analog circuit blocks 122 and image pixels 190 when first selector bits f1_sel and second selector bits f2_sel are supplied, in accordance with an embodiment of the invention. In the example of FIG. 7, image pixel group 196 includes 16 image pixels 190 and analog circuit block group 126 includes four analog circuit blocks 122. First multiplexer 80 and second multiplexer 82 include a data input terminal 0 that receives a constant ground signal, a data input terminal 5 that receives a constant high signal, and data inputs <1:4:> that receive pixel address bits pix<3:0>.

As shown in column 500, when first selector bits f1_sel has a numerical value of 5 and second selector bits f0_sel has a numerical value of 4, image pixels 0-15 are connected to analog circuit block 122-0 (e.g., each and every pixel in that group 196 is coupled to first block 122-0). As shown in column 502, when first selector bits f1_sel has a numerical value of to 4 and second selector bits f0_sel has a numerical value of 3, image pixels 0-7 are connected to analog circuit block 122-0 and image pixels 8-15 are connected to analog circuit block 122-1. As shown in column 504, when first selector bits f1_sel has a numerical value of 3 and second selector bits f0_sel has a numerical value of 2, image pixels 0-3 are connected to analog circuit block 122-0, image pixels 4-7 are connected to analog circuit block 122-1, image pixels 8-11 are connected to analog circuit block 122-2, and image pixels 12-15 are connected to analog circuit block 122-3. As shown in column 506, when first selector bits f1_sel has a numerical value of 1 and second selector bits f0_sel has a numerical value of 0, image pixel 0 is connected to analog circuit block 122-0, image pixel 1 is connected to analog circuit block 122-1, image pixel 2 is connected to analog circuit block 122-2, and image pixel 3 is connected to analog circuit block 122-3. Each four consecutive image pixels are connected in this way.

As shown in column 508, when first selector bits f1_sel has a numerical value of 1, second selector bits f0_sel has a numerical value of 0, and second pixel inversion bit f0_inv is applied to invert the output from second multiplexer 82, image pixel 0 is connected to analog circuit block 122-0, image pixel 1 is connected to analog circuit block 122-1, image pixel 2 is connected to analog circuit block 122-2, and image pixel 3 is connected to analog circuit block 122-3. Each four consecutive image pixels are connected in this way. First inversion bit f1_inv and second inversion bit f0_inv are applied to change the interconnections between image pixels 190 in image pixel group 196 and analog circuit blocks 122 in analog circuit block group 126. The table of FIG. 7 only illustrates some of the possible configurations of selector bits f1_sel and f0_sel applied to interconnect circuit 210. Any suitable combination of selector bits f1_sel and f0_sel as well as inversion bits f1_inv and f0_inv may be implemented by configurable interconnect 210.

Figure 8:
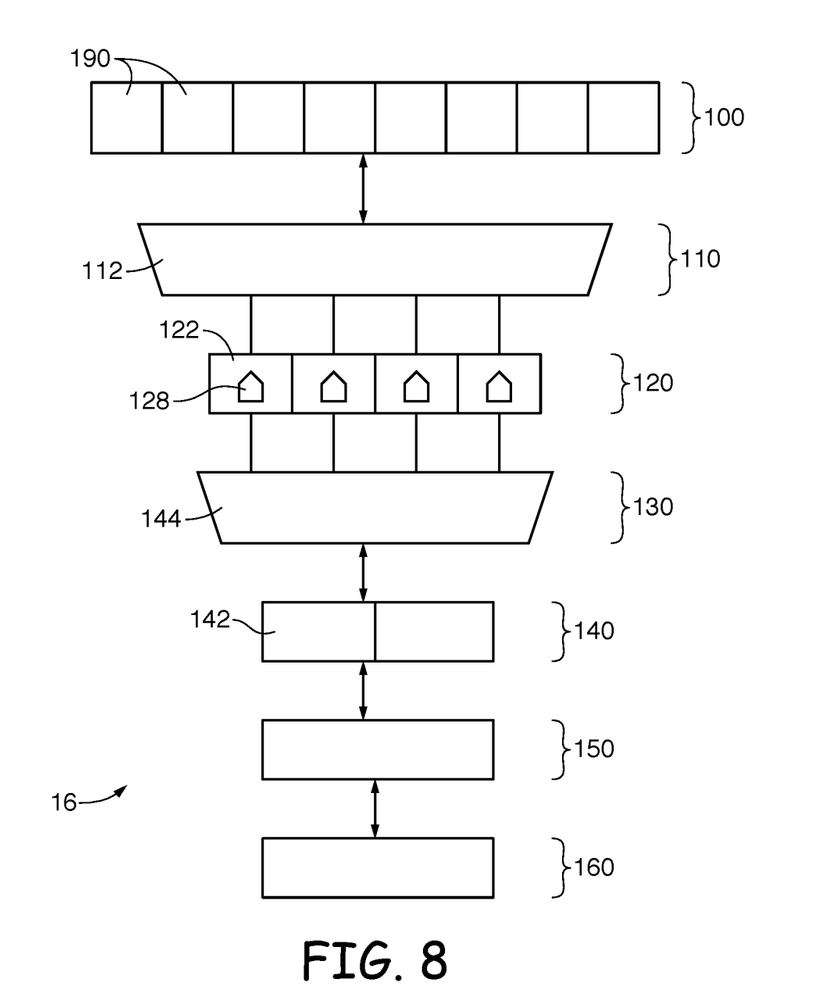
FIG. 8 is a diagram of an illustrative image sensor with circuitry and various levels of interconnect in accordance with an embodiment of the present invention.

FIG. 8 shows a diagram of the layers of interconnection in image sensor 16 in accordance with an embodiment of the invention. Image sensor 16 may include image pixel array 100 that includes a first number of image pixels 190. Image pixels 190 may be coupled to configurable paths 112 formed in first interconnect fabric 110. Analog processing and control circuitry 120 may include a second number of analog circuit blocks 122 that is less than the first number. Each analog circuit block 122 may be selectively coupled to each image pixel 190 via paths 112. Analog circuit blocks 122 may include analog to digital converters 128 for converting image signals into digital signals. Analog circuit blocks 122 may be coupled to paths 114 formed in second interconnect fabric 130. Digital processing and control circuitry 140 may include a third number of digital circuit blocks 142 that is less than the second number. Each digital circuit block 142 may be selectively coupled to each analog circuit block 122 via programmable paths 112. Digital circuit blocks 142 may be coupled to memory circuitry 150. Memory circuitry 150 may be coupled to processing circuitry 160.

By forming configurable paths 112 between image pixels 190 and analog circuit blocks 122, a large number of image pixels 190 may be controlled and read out by a small number of analog circuit blocks 122 and an even smaller number of digital circuit blocks 142. In addition, the specific interconnections between image pixels 190 and analog circuit blocks 122 can change while operating image sensor 16. In this way, image pixels 190 may be controlled and read out in any suitable manner based upon the configuration of paths 112. Paths 112 may be configured to allow image sensors 16 to flexibly control and read out image pixels 190 for use in, for example, HDR imaging, light field cameras, and microsaccade imaging. Image sensors 16 may also allow for local error correction to correct errors in image pixel subsets 196 without having to read out all image pixels 190 in image pixel array 100, thereby introducing fewer loading and timing problems.

Figure 9:
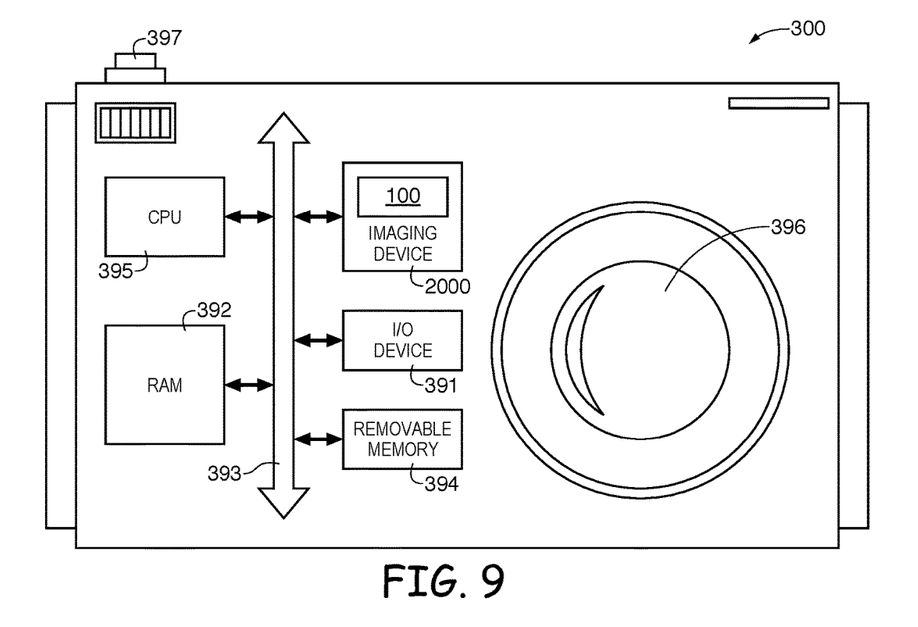
FIG. 9 is a block diagram of a processor system employing the image sensor of FIGS. 2-8 in accordance with an embodiment of the present invention.

FIG. 9 shows in simplified form a typical processor system 300, such as a digital camera, which includes an imaging device 2000 (e.g., an imaging device 2000 such as imaging sensor 16 of FIGS. 2-8 employing a flexible and highly interconnected image pixel array as described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300, for example a digital still or video camera system, generally includes a lens 396 for focusing an image on pixel array 100 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating an image sensor with configurable image sensor pixel interconnections. An image sensor may include an image sensor array formed from rows and columns of image sensor pixels. Analog control circuitry may control and read out the image sensor pixels in the image sensor pixel array. The analog control circuitry may be vertically stacked with respect to the image sensor pixel array. Configurable interconnect circuitry may be interposed between the analog control circuitry and the image sensor pixel array. The analog control circuitry may include a number of analog circuit blocks that are arranged into analog circuit block groups. The configurable interconnect circuitry may include configurable paths that couple each image sensor pixel in the image sensor pixel array to at least one analog circuit block in a corresponding analog circuit block group. The configurable interconnect circuitry may be controlled to reroute the connections between the image sensor pixels and the particular analog circuit blocks in each analog circuit block group.

In one suitable arrangement, the analog circuit blocks may be coupled to a group of image sensor pixels arranged in the image sensor array via the configurable interconnect circuitry. The group of image sensor pixels may be formed from a portion of the image sensor array. Addressing circuitry may supply control signals to the configurable interconnect circuitry to selectively route an analog circuit block to a corresponding image sensor pixel by rerouting the configurable paths in the first configurable interconnect fabric. Signals to and from a portion of the image sensor pixels in the image sensor pixel group may be routed to a first analog circuit block in the analog circuit block group and signals to and from a different portion of the image sensor pixels in the image sensor pixel group may be routed to a second analog circuitry block in the analog circuit block group. The configurable interconnect fabric may include a configurable interconnect circuit corresponding to each image pixel in the image pixel group.

Each image pixel in the image pixel group may be accessed simultaneously by the analog circuitry block group via the corresponding configurable interconnect circuits. Each group of image sensor pixels that is accessed may be formed, for example, from image pixels arranged in at least two adjacent rows, at least two adjacent columns, at least two non-adjacent rows, or at least two non-adjacent columns in the image sensor array. The image sensor array may include a first group of image sensor pixels and a second group of image sensor pixels. The image sensor pixels in the first group may be simultaneously accessed during a first time period and the image sensor pixels in the second group be simultaneously accessed during a second time period that is different than the first time period. A selected group of image sensor pixels in the image sensor array may be accessed simultaneously without accessing at least some image sensor pixels in the at least two rows that are part of another group of image sensor pixels that is different than the selected group.

The image sensor may be placed in a first configuration in which the configurable interconnect circuitry routes first control signals from a first analog control circuit block to a first image sensor pixel in the image sensor array and the configurable interconnect circuitry routes the first control signals to a second image sensor pixel in the image sensor array. When the image sensor is placed in the first configuration, the configurable interconnect circuitry may, for example, route the first control signals to the first image sensor pixel without routing the second control signals to the first image sensor pixel. When the image sensor is placed in the first configuration, the configurable interconnect circuitry may also route pixel output signals generated from the first image sensor pixel to the first analog circuit block.

The image sensor may also be placed in a second configuration in which the configurable interconnect circuitry routes second control signals from a second analog control circuit block to the first image sensor pixel and the configurable interconnect circuitry routes pixel output signals generated from the first image sensor pixel to the second control circuit.

A configurable interconnect circuit may include a pixel control signal routing multiplexer which serves to route control signals from the analog circuit blocks in the analog circuit block group to the corresponding image pixel. The configurable interconnect circuit may also include a pixel output signal routing multiplexer which serves to route pixel output signals from the corresponding image pixel to the analog circuit block group.

The configurable interconnect circuit may also include multiplexers hardwired with the address of the corresponding pixel to its data inputs and logic XOR gates that are coupled to the multiplexers. The addressing circuitry may provide selector and inversion control signals to the multiplexers and XOR gates to control the pixel output signal routing multiplexer and the pixel control signal routing multiplexer. The addressing circuitry may control the routing of pixel output signals and pixel control signals by adjusting control signals provided to the multiplexers and XOR gates.

As an example, four analog control blocks may be coupled to 64 image pixels in an image pixel group via configurable paths. Two multiplexers with six data inputs and two XOR gates may be provided with control signals for routing each of the 64 image pixels to one of the four analog circuit blocks.

As another example, four analog control blocks may be coupled to 16 image pixels in an image pixel group via configurable paths. Two multiplexers with four data inputs and two XOR gates may be provided with control signals for routing each of the 16 image pixels to one of the four analog circuit blocks.

Image sensor digital processing and control circuitry may control the image sensor pixels in the image sensor pixel array and receive image signals from the analog control circuitry. The image sensor digital processing and control circuitry may be vertically stacked with respect to the analog control circuitry. A second configurable interconnect circuitry may be interposed between the analog control circuitry and the digital circuitry. The digital circuitry may include a number of digital circuit blocks that are arranged into digital circuit block groups. The second configurable interconnect fabric may include many configurable paths that couple each analog circuit block in the analog circuit block group to at least one digital circuit block in a corresponding digital circuit block group. The digital circuitry may be coupled to processing circuitry via memory circuit blocks.

The digital processing and control circuitry, analog control circuitry, first configurable interconnect circuitry, and second configurable interconnect circuitry may be formed on shared or separate integrated circuits. The integrated circuits may be vertically stacked. There may be a large number of image sensor pixels in the image sensor pixel array coupled to a small number of analog circuit blocks in the analog control circuitry which are coupled to an even smaller number of digital circuit blocks in the digital control circuitry. The wiring complexity of and the number of interconnections at the pixel level may be substantially greater than the number of interconnections at the digital block level.

The image sensor with configurable pixel interconnections may be implemented in a system that also includes a central processing unit, memory, input-output circuitry, and an imaging device that further includes a pixel array, a lens for focusing light onto the pixel array, and a data converting circuit.

The foregoing is merely illustrative of the principles of this invention which can be practiced in other embodiments.

What is claimed is:

1. A method of operating an image sensor comprising first and second groups of image pixels, wherein the image sensor is coupled to a plurality of control circuits, the method comprising:
generating image signals using the first and second groups of image pixels, wherein the first group of image pixels includes image pixels from at least two adjacent rows and image pixels from at least two adjacent columns, and wherein the second group of image pixels includes image pixels from at least two adjacent rows and image pixels from at least two adjacent columns;
routing signals from a selected control circuit of the plurality of control circuits to a selected one of the first and second groups of image pixels using configurable interconnect circuitry; and
routing the image signals generated by the selected one of the first and second groups of image pixels to an additional selected control circuit of the plurality of control circuits using the configurable interconnect circuitry.

2. The method defined in claim 1, further comprising:
receiving selector bits at control inputs of an address generating multiplexer;
receiving pixel address bits corresponding to a given pixel in the selected one of the first and second groups of image pixels at data inputs of the address generating multiplexer; and
using the address generating multiplexer to output a selected pixel address bit of the pixel address bits based on the selector bits.

3. The method defined in claim 2, further comprising:
receiving the selected pixel address bit at logic circuitry; and
using the logic circuitry to output a selection signal based on the pixel address bit.

4. The method defined in claim 3, wherein receiving the selected pixel address bit at the logic circuitry comprises:
receiving the selected pixel address bit at inverting circuitry.

5. The method defined in claim 3, wherein receiving the selected pixel address bit at the logic circuitry comprises:
receiving the selected pixel address bit at an input of an XOR gate.

6. The method defined in claim 3, wherein routing signals from the selected control circuit to the selected group of image pixels comprises:
receiving the selection signal from the logic circuitry at control inputs of a control signal routing multiplexer;
receiving pixel control signals from the plurality of control circuits; and
using the control signal routing multiplexer to route pixel control signals of the selected control circuit to the selected group of image pixels based on the selection signal.

7. The method defined in claim 3, wherein routing the image signals generated by the first group of image pixels to the additional selected control circuit comprises:
receiving the selection signal from the logic circuitry at control inputs of a demultiplexer having outputs coupled to the plurality of control circuits;
receiving an image signal from a given pixel in the first group of image pixels at an input of the demultiplexer; and
using the demultiplexer to route the image signal from the given pixel to the additional selected control circuit based on the selection signal.

8. The method defined in claim 1, further comprising:
routing the image signals generated by the second group of image pixels to the additional selected control circuit, while routing the image signals generated by the first group of image pixels to the additional selected control circuit.

9. The method defined in claim 1, further comprising:
routing the image signals generated by the second group of image pixels to the selected control circuit while routing the image signals generated by the first group of image pixels to the additional selected control circuit.

10. A method of operating an image sensor comprising first and second groups of image pixels arranged in rows and columns, wherein the image sensor is coupled to a plurality of control circuits, the method comprising:
sensing light with the first and second groups of image pixels;
selectively routing control signals from a first control circuit of the plurality of control circuits to the first group of image pixels using configurable interconnect circuitry;
selectively routing pixel output signals from the first group of image pixels to a second control circuit of the plurality of control circuits using the configurable interconnect circuitry;
receiving selector bits at control inputs of an address generating multiplexer;
receiving pixel address bits corresponding to a given pixel in the selected one of the first and second groups of image pixels at data inputs of the address generating multiplexer; and using the address generating multiplexer to output a selected pixel address bit of the pixel address bits based on the selector bits.

11. The method defined in claim 10, wherein the first group of image pixels includes image pixels from at least two adjacent rows.

12. The method defined in claim 11, wherein the first group of image pixels includes image pixels from at least two adjacent columns.

13. The method defined in claim 10, wherein the control signals are selectively routed from the first control circuit to the first group of image pixels during a first time period, the method further comprising:
selectively routing additional control signals from a third control circuit of the plurality of control circuits to the second group of image pixels during a second time period that is different than the first time period.

14. The method defined in claim 10, further comprising:
receiving the selected pixel address bit at logic circuitry; and
using the logic circuitry to output a selection signal based on the pixel address bit.

15. The method defined in claim 14, wherein selectively routing control signals from the first control circuit to the first group of image pixels further comprises:
receiving the selection signal from the logic circuitry at control inputs of a control signal routing multiplexer;
receiving pixel control signals from the plurality of control circuits; and
using the control routing multiplexer to route the control signals from the first control circuit to the first group of image pixels based on the selection signal.

16. An image sensor comprising:
a first group of image pixels that generates image signals and that is coupled to a plurality of control circuits;
a second group of image pixels that generates image signals and that is coupled to the plurality of control circuits;
configurable interconnect circuitry that routes signals from a selected control circuit of the plurality of control circuits to a selected one of the first and second groups of image pixels, and that routes the image signals generated by the first group of image pixels to an additional selected control circuit of the plurality of control circuits; and
an address generating multiplexer having control inputs at which selector bits are received, and having data inputs at which pixel address bits corresponding to a given pixel in the selected one of the first and second groups of pixels are received, wherein the address generating multiplexer outputs a selected pixel address bit of the pixel address bits based on the selector bits.

17. The image sensor defined in claim 16, wherein the configurable interconnect circuitry further comprises:
logic circuitry that receives the selected pixel address bit from the address generating multiplexer, and that outputs a selection signal based on the pixel address bit.

18. The image sensor defined in claim 17, wherein the configurable interconnect circuitry further comprises:
a control signal routing multiplexer that receives the selection signal from the logic circuitry, and that routes control signals from the selected control circuit to the selected group of image pixels based on the selection signal.

* * * * *